(12) United States Patent
Lee et al.

(10) Patent No.: US 11,890,985 B2
(45) Date of Patent: Feb. 6, 2024

(54) VEHICLE LAMP

(71) Applicant: SL Corporation, Daegu (KR)

(72) Inventors: Jeong Su Lee, Gyeongsan-si (KR); Jong Woon Kim, Gyeongsan-si (KR); Nak Jung Choi, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/873,074

(22) Filed: Jul. 25, 2022

(65) Prior Publication Data

US 2023/0166654 A1 Jun. 1, 2023

(30) Foreign Application Priority Data

Nov. 30, 2021 (KR) .................. 10-2021-0169207

(51) Int. Cl.
*B60Q 1/38* (2006.01)
*F21S 43/14* (2018.01)
*F21S 43/249* (2018.01)
*F21Y 115/10* (2016.01)

(52) U.S. Cl.
CPC .............. *B60Q 1/381* (2022.05); *F21S 43/14* (2018.01); *F21S 43/249* (2018.01); *F21Y 2115/10* (2016.08)

(58) Field of Classification Search
CPC .......... B60Q 1/381; F21S 43/249; F21S 43/14
See application file for complete search history.

(56) References Cited

U.S. PATENT DOCUMENTS

| 10,955,102 | B1 * | 3/2021 | Lee ...................... F21S 41/151 |
| 2014/0328071 | A1 * | 11/2014 | Son ....................... F21S 41/285 362/464 |
| 2018/0238511 | A1 * | 8/2018 | Hartmann ............. F21S 41/265 |
| 2020/0063938 | A1 * | 2/2020 | Kurashige ............. G02B 27/30 |
| 2020/0207257 | A1 * | 7/2020 | Choi .................... B60Q 11/007 |
| 2021/0341123 | A1 * | 11/2021 | Mototsuji ............. F21S 41/143 |
| 2023/0003358 | A1 * | 1/2023 | Kang ..................... F21S 43/20 |

* cited by examiner

*Primary Examiner* — Christopher E Dunay
(74) *Attorney, Agent, or Firm* — United One Law Group LLC; Kongsik Kim; Jhongwoo Peck

(57) ABSTRACT

A vehicle lamp includes a light source unit including a plurality of light sources; an optical unit including a plurality of incidence lenses, a plurality of emission lenses corresponding to the plurality of incidence lenses, and a plurality of shields each configured to block a part of light from being incident on each of the plurality of emission lenses; and a light transmission unit that transmits light generated from the light source unit to the optical unit. In particular, the optical unit is divided into a plurality of transmission regions that transmit the light generated from each of the plurality of light sources to allow a pattern region corresponding to each of the plurality of light sources to be formed.

15 Claims, 15 Drawing Sheets

VEHICLE LAMP

CROSS-REFERENCE TO RELATED APPLICATION(S)

This application claims priority from Korean Application No. 10-2021-0169207 filed on Nov. 30, 2021, which application is incorporated herein by reference in its entirety.

BACKGROUND

1. Technical Field

The present disclosure relates to a vehicle lamp, and more specifically, to a vehicle lamp capable of forming a light distribution pattern that includes a plurality of pattern regions while simplifying a configuration.

2. Description of the Related Art

Vehicles are provided with various types of lamps having an illumination function for easily identifying objects located around a vehicle during low-light conditions (e.g., night-time driving) and a signaling function for notifying drivers of surrounding vehicles or pedestrians of the state of the vehicle.

For example, headlamps and fog lamps mainly serve the illumination function, and turn signal lamps, tail lamps, brake lamps, and the like mainly serve the signaling function. The installation criteria and standards of each lamp are stipulated by the laws and regulations to fully function.

In recent years, research has been actively conducted to reduce the size of the lamp using microlenses having a relatively short focal length, and in this case, light distribution patterns having a required shape or size are formed by the light emitted from several microlenses.

When the light distribution pattern includes a plurality of pattern regions, an optical system for forming each pattern region is required separately, and in this case, since a configuration becomes complicated and the cost increases, there is a need for a means capable of forming a light distribution pattern that includes a plurality of pattern regions while being able to simplify the configuration.

SUMMARY

The present disclosure is directed to providing a vehicle lamp, which may easily form a plurality of pattern regions without separately providing an optical system to form each pattern region when a light distribution pattern includes the plurality of pattern regions.

The objects of the present disclosure are not limited to the above-described objects, and other objects not mentioned will be clearly understood by those skilled in the art from the following description.

According to an aspect of the present disclosure, a vehicle lamp may include a light source unit including a plurality of light sources; an optical unit including a plurality of incidence lenses, a plurality of emission lenses corresponding to the plurality of incidence lenses, and a plurality of shields each configured to block a part of light from being incident on each of the plurality of emission lenses; and a light transmission unit that transmits light generated from the light source unit to the optical unit. In particular, the optical unit may be divided into a plurality of transmission regions that transmit the light generated from each of the plurality of light sources to cause a pattern region corresponding to each of the plurality of light sources to be formed.

The plurality of light sources may be simultaneously turned on or off. Alternatively, the plurality of light sources may be sequentially turned on or off. The pattern region may be formed on a road surface around a vehicle.

The plurality of transmission regions may includes a first transmission region that transmits light of a first light source among the plurality of light sources to cause a first pattern region to be formed; and a second transmission region that transmits light of a second light source among the plurality of light sources to cause a second pattern region to be formed. In some such embodiments, the first pattern region may be formed at a farther distance from a vehicle than the second pattern region, and the first transmission region may have a size larger than a size of the second transmission region. Further, a first emission lens that belongs to the first transmission region among the plurality of emission lenses may have a dimension smaller than a dimension of a second emission lens that belongs to the second transmission region among the plurality of emission lenses. Each of the plurality of shields may include an opening through which light is transmitted, and an opening of a first shield corresponding to the first emission lens among the plurality of shields may have a size smaller than a size of an opening of a second shield corresponding to the second emission lens among the plurality of shields.

In some embodiments, the first pattern region may have a size larger than a size of the second pattern region, and the first transmission region may have a size larger than a size of the second transmission region. Further, a first emission lens that belongs to the first transmission region among the plurality of emission lenses may have a dimension larger than a dimension of a second emission lens that belongs to the second transmission region among the plurality of emission lenses. Each of the plurality of shields may include an opening through which light is transmitted, and an opening of a first shield corresponding to the first emission lens among the plurality of shields may have a size larger than a size of an opening of a second shield corresponding to the second emission lens among the plurality of shields.

The optical unit may include an optical member having the plurality of incidence lenses disposed on an incidence surface, and the plurality of emission lenses disposed on an emission surface, and the plurality of shields may be formed at one surface of the optical member or inside the optical member.

The light transmission unit may include a plurality of light guide units that guide light generated from each of the plurality of light sources to the optical unit. The plurality of light guide units may convert the light incident from each of the plurality of light sources into substantially parallel light. Each of the plurality of light guide units may include an incidence surface and an emission surface, and the incidence surfaces of the plurality of light guide units may be integrally formed. Further, each of the plurality of light guide units may have a size corresponding to each of the plurality of transmission regions.

A vehicle lamp according to the present disclosure may provide one or more of the following effects. When a light distribution pattern including a plurality of pattern regions is formed, components configured to form the plurality of light distribution patterns can be commonly used, and thus the configuration can be simplified. The effects of the present disclosure are not limited to the above-described effects, and other effects not mentioned will be clearly understood by those skilled in the art from the description of the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
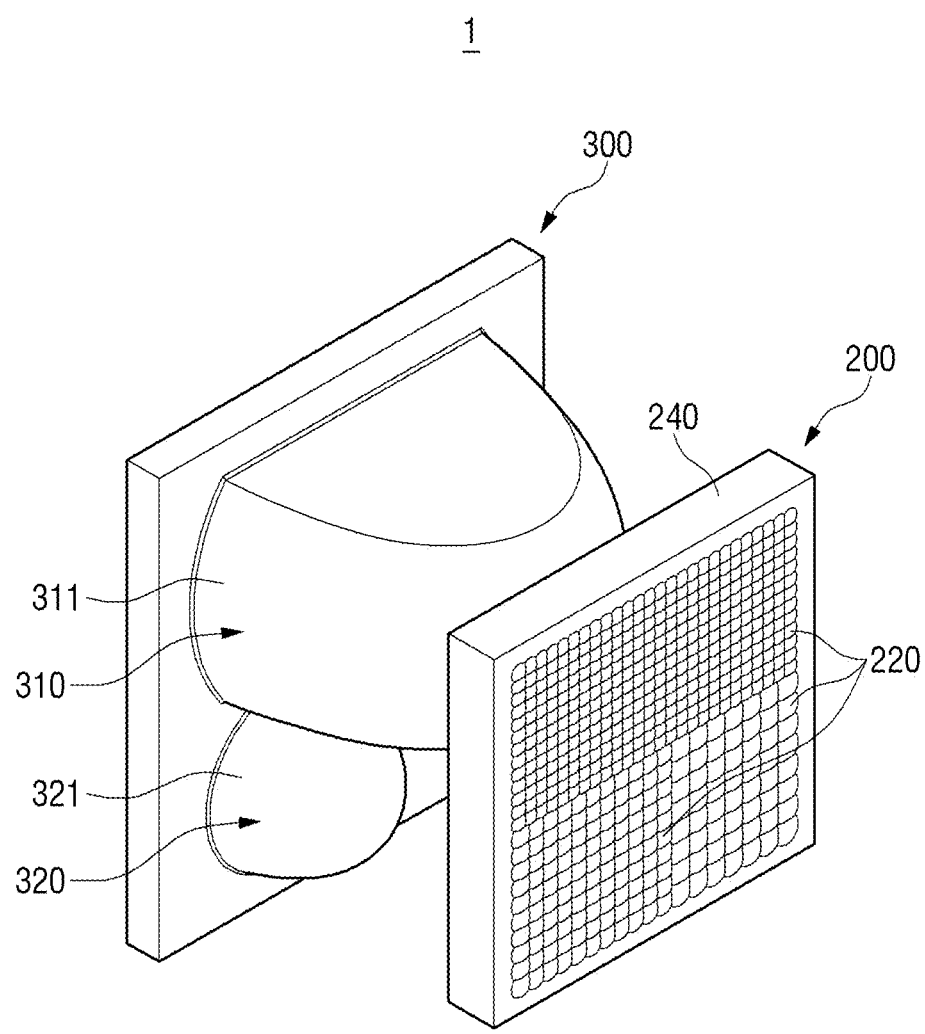
FIGS. 1 and 2 are perspective views showing a vehicle lamp according to an embodiment of the present disclosure.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a vehicle lamp according to embodiments of the present disclosure.

Figure 2:
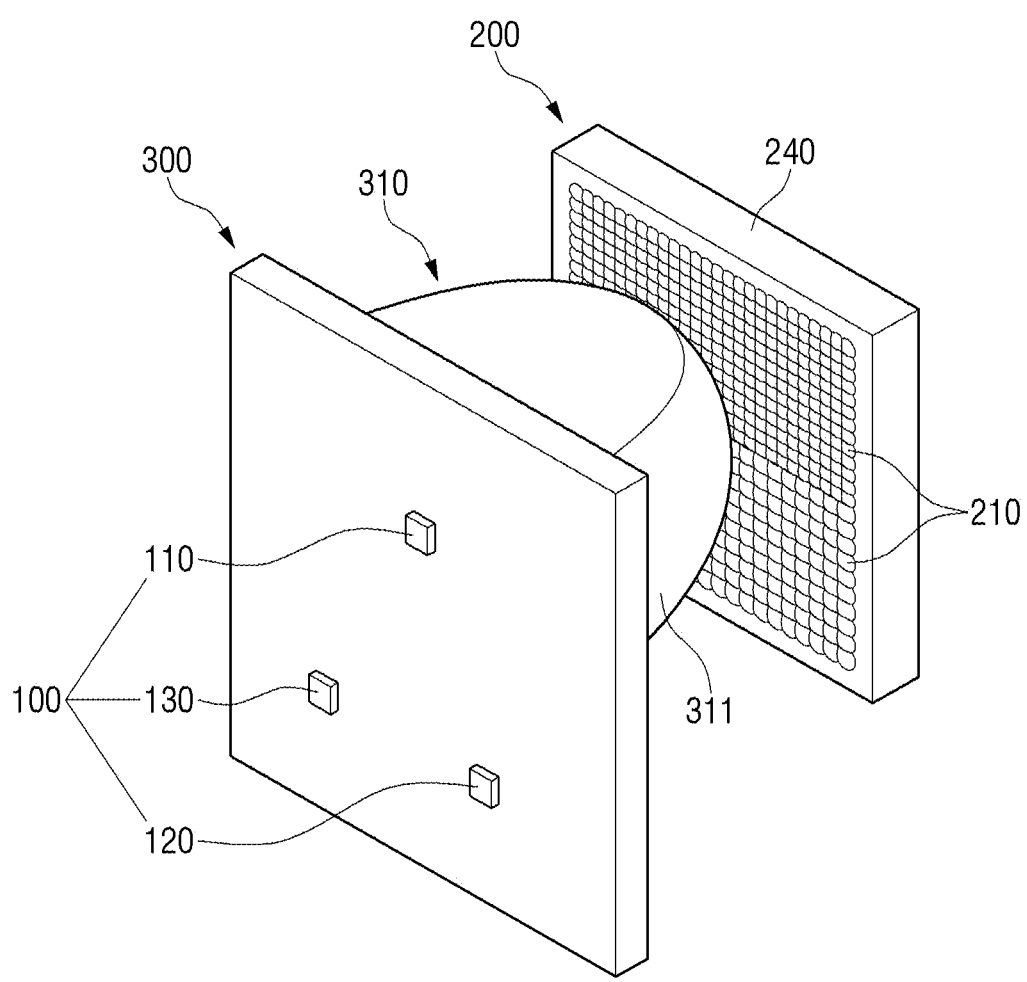
Figure 3:
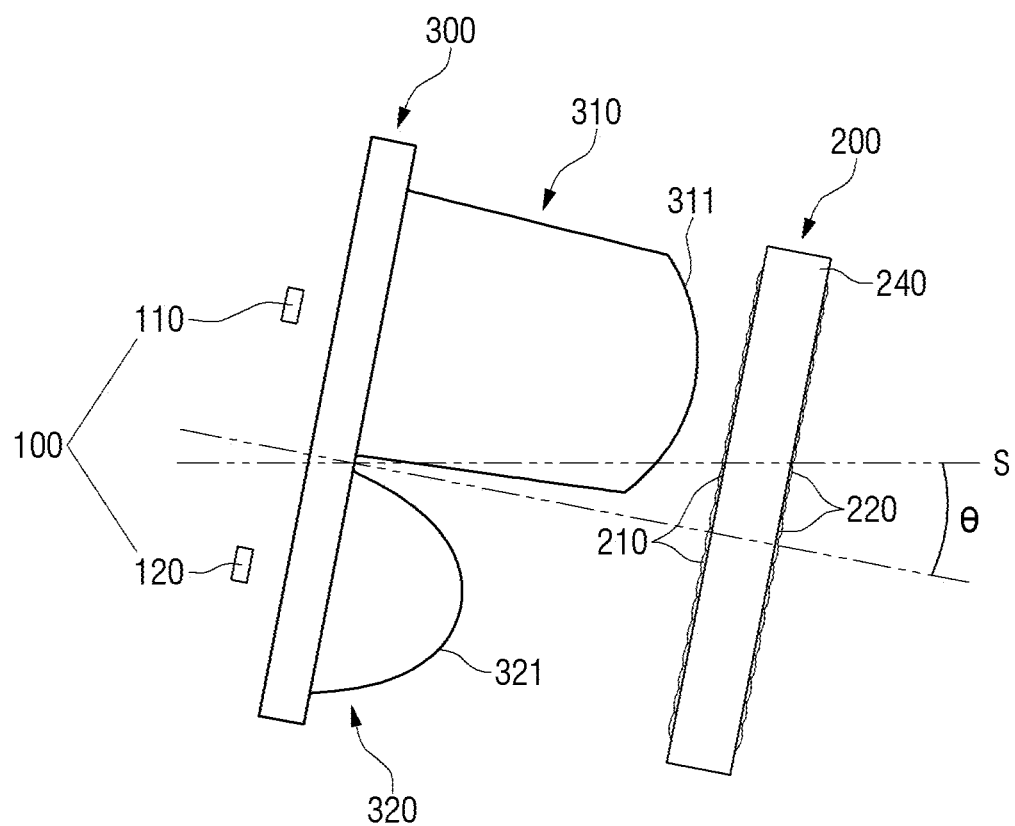
FIG. 3 is a side view showing the vehicle lamp according to the embodiment of the present disclosure.

FIGS. 1 and 2 are perspective views showing a vehicle lamp according to an embodiment of the present disclosure, and FIG. 3 is a side view showing the vehicle lamp according to the embodiment of the present disclosure. Referring to FIG. 1, a vehicle lamp 1 according to an embodiment of the present disclosure may include a light source unit 100, an optical unit 200, and a light transmission unit 300. The light source unit 100, the optical unit 200, and the light transmission unit 300 may be accommodated in an interior space formed by a lamp housing (not shown) and a cover lens (not shown) coupled to the lamp housing to radiate light to the outside of a vehicle.

In the embodiment of the present disclosure, the vehicle lamp 1 may be used for various functions including an illumination function such as a head lamp to allow a driver's view to be secured when a vehicle operation in low-light conditions (e.g., at night), a signaling function such as a position lamp, a daytime running lamp (DRL), a turn signal lamp, a brake lamp, and the like to inform drivers of surrounding vehicles or pedestrians of a state of a vehicle, and a function to form light distribution patterns consisting of characters, patterns, or a combination thereof indicating various information that needs to be conveyed on a road surface around the vehicle for the drivers or the pedestrians. The vehicle lamp 1 according to the present disclosure may also be used for a single function among the above-described functions, and may also be used for two or more functions together.

Hereinafter, in the embodiment of the present disclosure, a case in which the vehicle lamp 1 according to the present disclosure is used for a function to form a light distribution pattern that includes at least one pattern region on the road surface around the vehicle will be described as an example. However, the present disclosure is not limited thereto, and the vehicle lamp 1 according to the present disclosure may also be similarly applied to form a light distribution pattern for the illumination function or the signaling function.

The light source unit 100 may generate light having a color and/or brightness suitable for the function of the vehicle lamp 1 according to the present disclosure, and the light generated from the light source unit 100 may proceed to be incident on the optical unit 200 disposed in front of the light source unit 100.

Herein, the description that the optical unit 200 is disposed in front of the light source unit 100 is based on a configuration that a direction in which the light is radiated from the vehicle lamp 1 according to the present disclosure is the front. However, the actual direction to which the front actually refers may vary depending on an installation location and/or direction of the vehicle lamp 1 according to the present disclosure.

In addition, when the vehicle lamp 1 according to the present disclosure forms the light distribution pattern on the road surface around the vehicle, at least one of the light source unit 100, the optical unit 200, or the light transmission unit 300 may be installed to be inclined toward the road surface with respect to a horizontal direction, and in the embodiment of the present disclosure, a case in which all of the light source unit 100, the optical unit 200, and the light transmission unit 300 are inclined at a predetermined angle θ toward the road surface with respect to a horizontal direction S as a whole will be described as an example.

The light source unit 100 may include a plurality of light sources 110, 120, and 130, and in the embodiment of the present disclosure, the light source unit 100 may include the plurality of light sources 110, 120, and 130 so that a light distribution region may include a plurality of pattern regions, each of which corresponds to to each of the plurality of light sources 110, 120, and 130.

In particular, each of the plurality of pattern regions may have a shape of a character (e.g., a letter or a number), a pattern, or a combination thereof, and thus, the light distribution pattern including the plurality of pattern regions may also have a shape of a character, a pattern, or a combination thereof.

In the embodiment of the present disclosure, a case in which the light source unit 100 includes three light sources 110, 120, and 130 will be described as an example. However, the present disclosure is not limited thereto, and the number of light sources included in the light source unit 100 may be varied depending on the number of pattern regions included in the light distribution pattern to be formed by the vehicle lamp 1 according to the present disclosure.

Herein, the description that the light distribution pattern includes a plurality of pattern regions may mean that a plurality of pattern regions are formed to have a same size at a same distance from a vehicle, or to have a different size at a same distance from a vehicle, or to have a same size at a different distance from a vehicle, or to have a different size at a different distance from a vehicle.

In the embodiment of the present disclosure, a case in which a semiconductor light emitting device such as a light emitting diode (LED) is used as the plurality of light sources 110, 120, and 130 will be described as an example, but the present disclosure is not limited thereto.

Various types of light sources such as a laser diode (LD), a bulb, or the like, as well as an LED may be used as the plurality of light sources 110, 120, and 130. Further, optical elements such as a lens, a mirror, and a reflector may be additionally used depending on the type of the light source.

Hereinafter, in the embodiment of the present disclosure, the plurality of light sources 110, 120, and 130 are referred to as a first light source 110, a second light source 120, and a third light source 130.

The optical unit 200 may transmit the light generated from each of the plurality of light sources 110, 120, and 130 to allow a pattern region corresponding to each of the plurality of light sources 110, 120, and 130 to be formed. The plurality of light sources 110, 120, and 130 may be turned on or off at once (e.g., concurrently, simultaneously), and may be sequentially turned on or off. When the plurality of light sources 110, 120, and 130 are sequentially turned on or off, an animation effect may be implemented by the pattern region formed by each of the light sources 110, 120, and 130.

Figure 4:
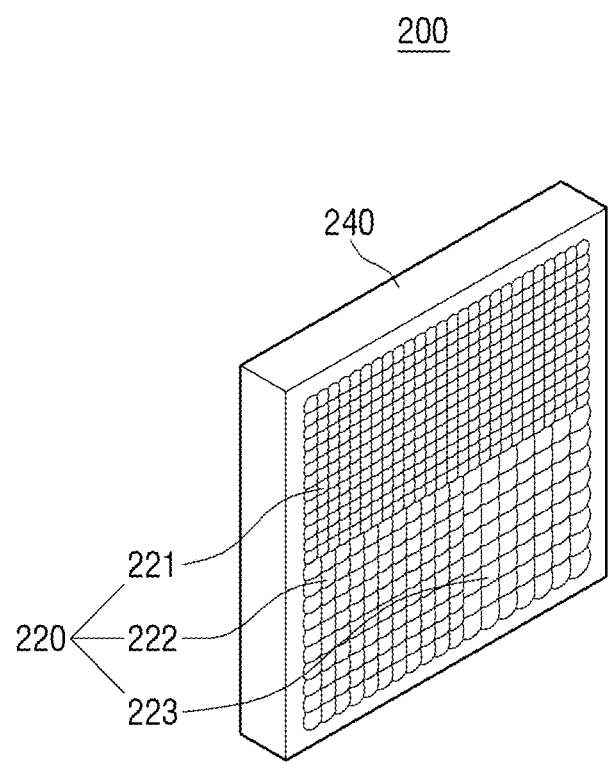
FIGS. 4 and 5 are perspective views showing an optical unit according to the embodiment of the present disclosure.
Figure 5:
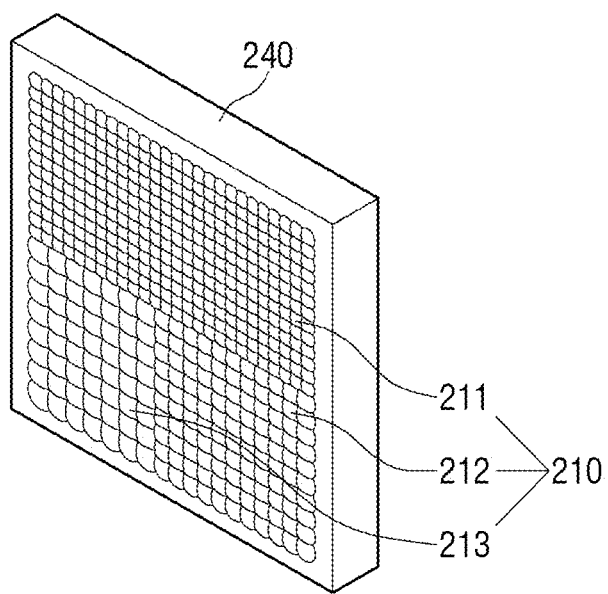
Figure 6:
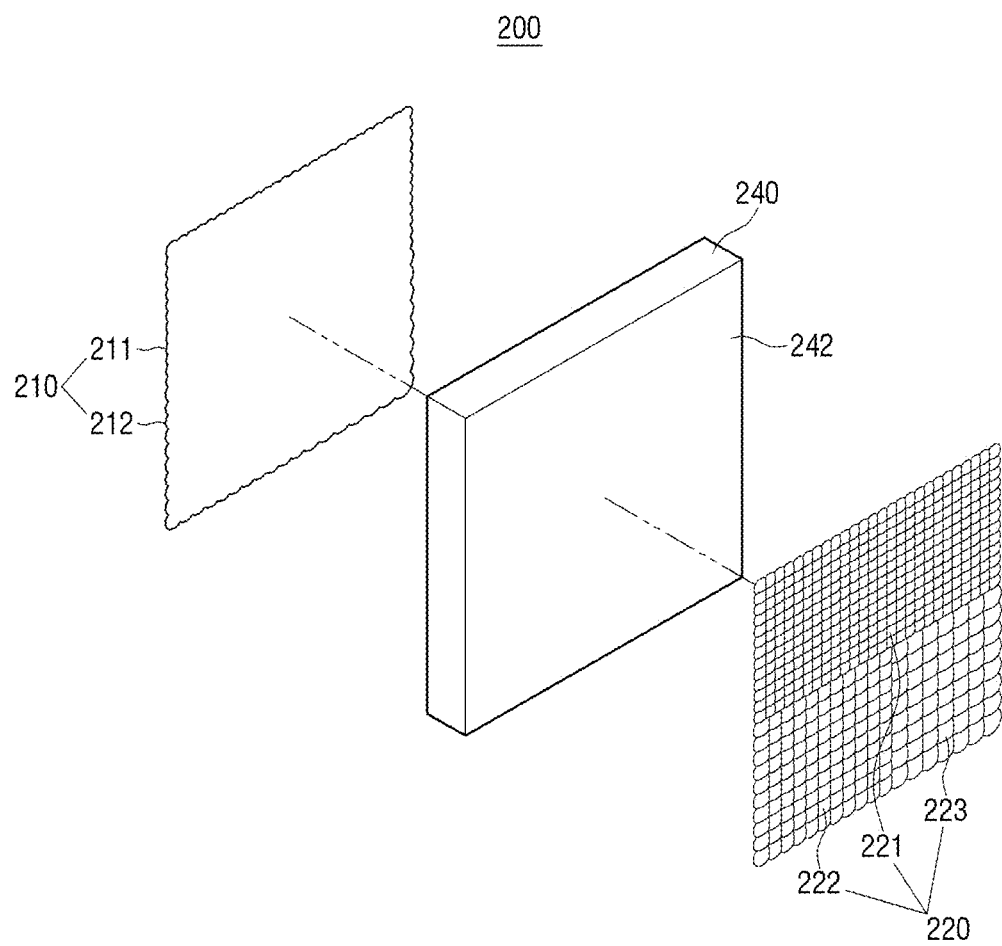
FIGS. 6 and 7 are exploded perspective views showing the optical unit according to the embodiment of the present disclosure.
Figure 7:
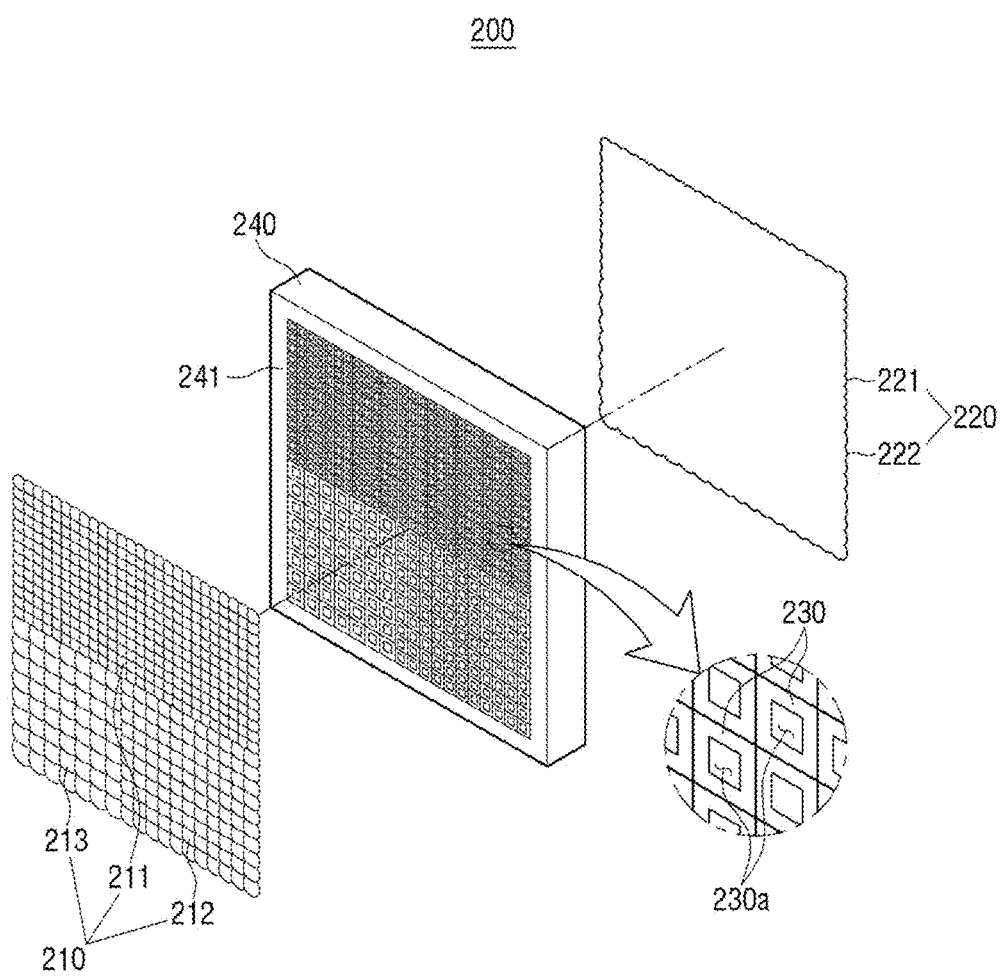
Figure 8:
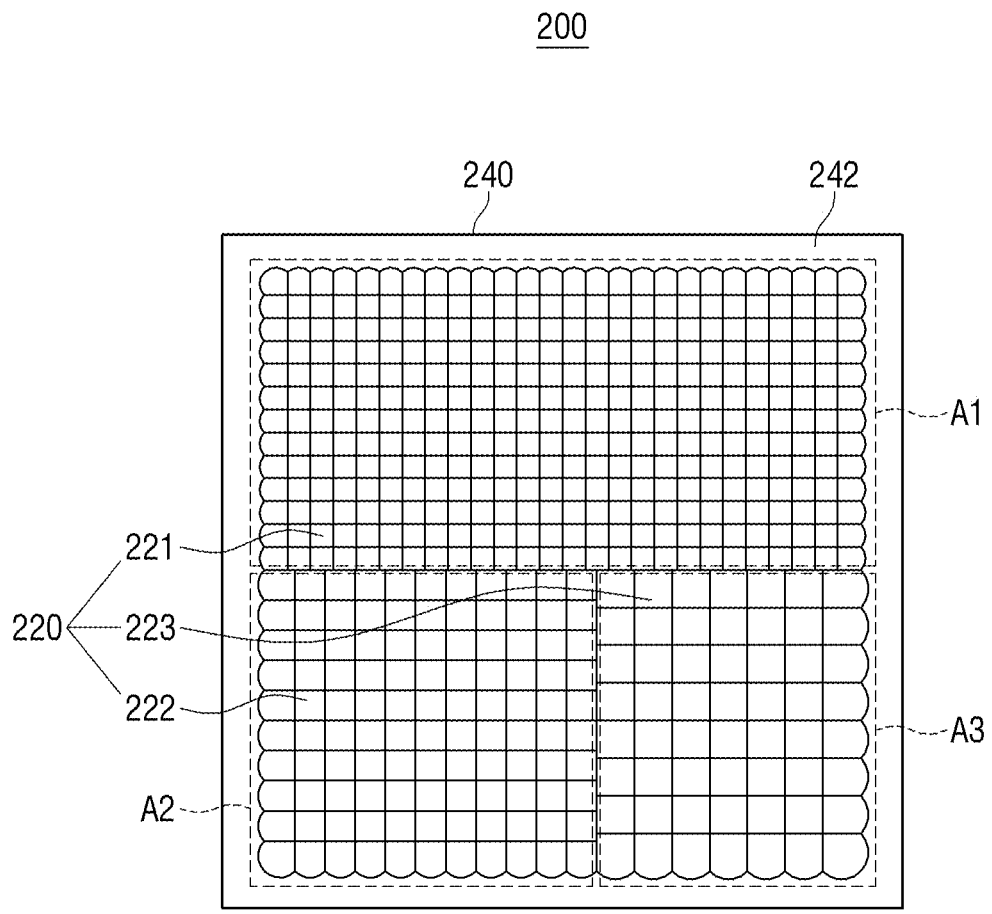
FIG. 8 is a front view showing the optical unit according to the embodiment of the present disclosure.

FIGS. 4 and 5 are perspective views showing an optical unit according to the embodiment of the present disclosure, FIGS. 6 and 7 are exploded perspective views showing the optical unit according to the embodiment of the present disclosure, and FIG. 8 is a front view showing the optical unit according to the embodiment of the present disclosure.

Referring to FIGS. 4 to 8, the optical unit 200 according to the embodiment of the present disclosure may include a plurality of incidence lenses 210 (which, in turn, includes incidence lens 211, 212, and 213), a plurality of emission lenses 220 (which, in turn, includes emission lens 221, 222, and 223), and a plurality of shields 230 (which, in turn, includes shields 231, 232, and 233).

The optical unit 200 may be divided into a plurality of transmission regions A1, A2, and A3 that transmit the light generated from each of the plurality of light sources 110, 120, and 130. In the embodiment of the present disclosure, the plurality of transmission regions A1, A2, and A3 may include a first transmission region A1 that transmits the light of the first light source 110, a second transmission region A2 that transmits the light of the second light source 120, and a third transmission region A3 that transmits the light of the third light source 130.

In this embodiment, the division of the optical unit 200 into three transmission regions A1, A2, and A3 is because the light source unit 100 includes three light sources 110, 120, and 130. However, the present disclosure is not limited thereto, and the optical unit 200 may be composed of one transmission region, or divided into two or more transmission regions depending on the number of light sources included in the light source unit 100.

Hereinafter, in the embodiment of the present disclosure, a pattern region formed by the light transmitting the first transmission region A1 is referred to as "a first pattern region," a pattern region formed by the light transmitting the second transmission region A2 is referred to as "a second pattern region," and a pattern region formed by the light transmitting the third transmission region A3 is referred to as "a third pattern region."

The plurality of incidence lenses 210 may be disposed on an incidence surface 241 of an optical member 240, which is made of a material through which light is transmittable, such as glass, and the plurality of emission lenses 220 may be disposed on an emission surface 242 of the optical member 240. The light incident on each of the plurality of incidence lenses 210 may be incident on and emitted from the emission lens of the plurality of emission lenses 220, which corresponds to the plurality of incidence lenses 210, through the optical member 240. For example, as the plurality of incidence lenses 210 and the plurality of emission lenses 220, microlenses having a relatively short focal length are used so that the size of the optical unit 200 may be reduced.

In the embodiment of the present disclosure, a case in which the plurality of incidence lenses 210 and the plurality of emission lenses 220 have a one-to-one correspondence will be described as an example, but the present disclosure is not limited thereto. The plurality of incidence lenses 210 and the plurality of emission lenses 220 may correspond to each other in a one-to-one, one-to-many, many-to-one, or many-to-many manner depending on the light distribution characteristics such as a shape, size, and location of the light distribution pattern formed by the vehicle lamp 1 according to the present disclosure. Examples of the plurality of incident lenses 210 and the plurality of emission lenses 220 corresponding one-to-one, one-to-many, many-to-one, or many-to-many can be found in U.S. Patent Application Publication No. 2019/0186706, which is incorporated herein by reference in its entirety.

The plurality of shields 230 may obstruct some light from being incident on each of the plurality of emission lenses 220, and each of the plurality of shields 230 may include an opening 230a through which light may be transmitted.

Accordingly, a shape and/or size of the pattern region that is formed by the light emitted through each of the plurality of emission lenses 220 may be changed depending on the shape and/or size of the opening 230a.

In the embodiment of the present disclosure, a case in which the plurality of shields 230 are formed on the incidence surface 241 of the optical member 240 by deposition or coating will be described as an example, but the present disclosure is not limited thereto. The plurality of shields 230 may be formed on any of the incidence surface 241 or the emission surface 242 of the optical member 240 or may also be formed inside the optical member 240. It may be understood that when the plurality of shields 230 are formed inside the optical member 240, two or more optical members 240 are present, and the plurality of shields 230 are interposed between any two of them.

The size of each of the plurality of transmission regions A1, A2, and A3 of the optical unit 200 may vary depending on the size of the pattern region to be formed by each of the plurality of transmission regions A1, A2, and A3 and the distance from the vehicle at which the pattern region is to be formed.

For example, when the first pattern region formed by the first transmission region A1 among the plurality of transmission regions A1, A2, and A3 is to be formed at the farthest distance from a vehicle, and the third pattern region to be formed by the third transmission region A3 is to be formed at the closest distance from a vehicle, the first transmission region A1 may have the largest size, and the third transmission region A3 may have the smallest size. Such a configuration may provide that the pattern regions formed at different distances from the vehicle may have a substantially uniform brightness since a larger amount of light is required as the pattern regions are formed at a longer distance from the vehicle.

It may be understood that the distances at which the first to third pattern regions are formed from the vehicle may refer to distances between the vehicle and a center of each of the first to third pattern regions in a direction to which the first to third pattern regions are projected by the vehicle lamp 1 according to the present disclosure.

In addition, when the size of the pattern region to be formed by the first transmission region A1 among the plurality of transmission regions A1, A2, and A3 is the largest and the size of the pattern region to be formed by the third transmission region A3 is the smallest, the first transmission region A1 may have the largest size, and the third transmission region A3 may have the smallest size. This is because a larger amount of light is required so that the pattern regions have a substantially uniform brightness as the size of the pattern regions increase.

Meanwhile, when the first to third pattern regions respectively formed by the first to third transmission regions A1, A2, and A3 have equal sizes but projected to different distances from the vehicle, or the first to third pattern regions have different sizes but projected to equal distances from the vehicle, the sizes of the emission lens and the shield that belong to each of the first to third transmission regions A1, A2, and A3 among the plurality of emission lenses 220 as well as the sizes of the first to third transmission regions A1, A2, and A3 may be varied accordingly.

Hereinafter, in the embodiment of the present disclosure, the emission lens that belongs to the first transmission region A1 among the plurality of emission lenses 220 is referred to as "a first emission lens," the emission lens that belongs to the second transmission region A2 among the plurality of emission lenses 220 is referred to as "a second emission lens," and the emission lens that belongs to the third transmission region A3 among the plurality of emission lenses 220 is referred to as "a third emission lens."

In addition, the shield that belongs to the first transmission region A1 among the plurality of shields 230 is referred to as "a first shield," the shield that belongs to the second transmission region A2 among the plurality of shields 230 is referred to as "a second shield," and the shield that belongs to the third transmission region A3 among the plurality of shields 230 is referred to as "a third shield."

Figure 9:
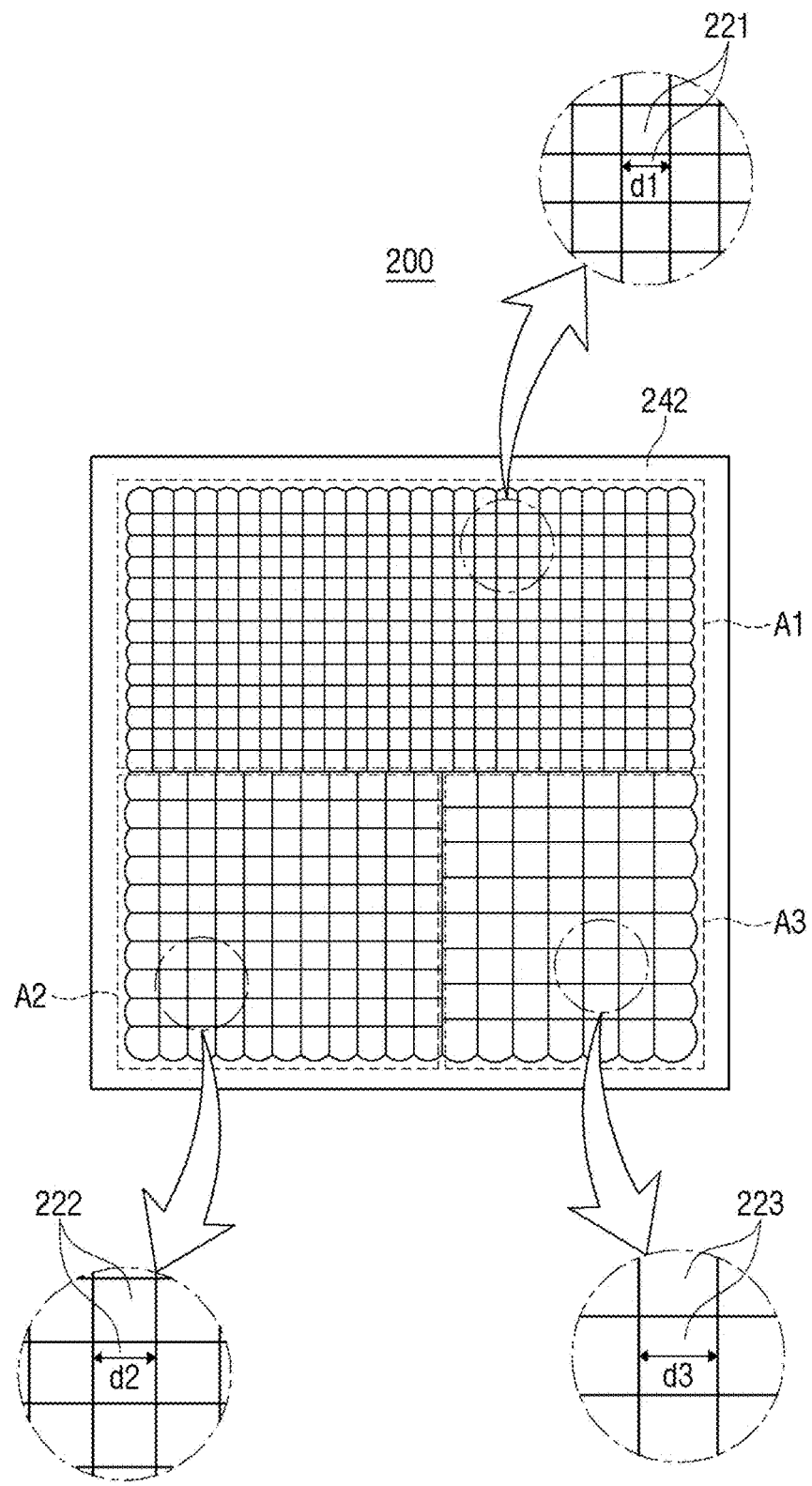
FIG. 9 is a schematic view showing emission lenses having different diameters depending on sizes of transmission regions according to the embodiment of the present disclosure.

FIG. 9 is a schematic view showing emission lenses having different diameters depending on sizes of transmission regions according to the embodiment of the present disclosure. Referring to FIG. 9, the first pattern region may have the largest size because the first pattern region to be formed by the light that is transmitted through the first transmission region A1 among the first to third transmission regions A1, A2, and A3 is formed at the farthest distance from the vehicle, and the third pattern region has the smallest size because the third pattern region to be formed by the light that is transmitted through the third transmission region A3 among the first to third transmission regions A1, A2, and A3 is formed at the closest distance from the vehicle.

Accordingly, the first emission lens 221 that belongs to the first transmission region A1 may have the smallest diameter d1, and the third emission lens 223 that belongs to the third transmission region A3 may have the largest diameter d3. This is because the sizes of the openings of the shields that belong to each of the first to third transmission regions A1, A2, and A3 among the plurality of shields 230 are different from one another. Herein, the term "diameter" may also mean a characteristic dimension of the lens when the lens is non-circular. For example, the term "diameter" may mean a length of an edge when the lens is formed in a square shape. The term "diameter" may also be understood as a diameter of a putative circular lens that is cut on each side.

Figure 10:
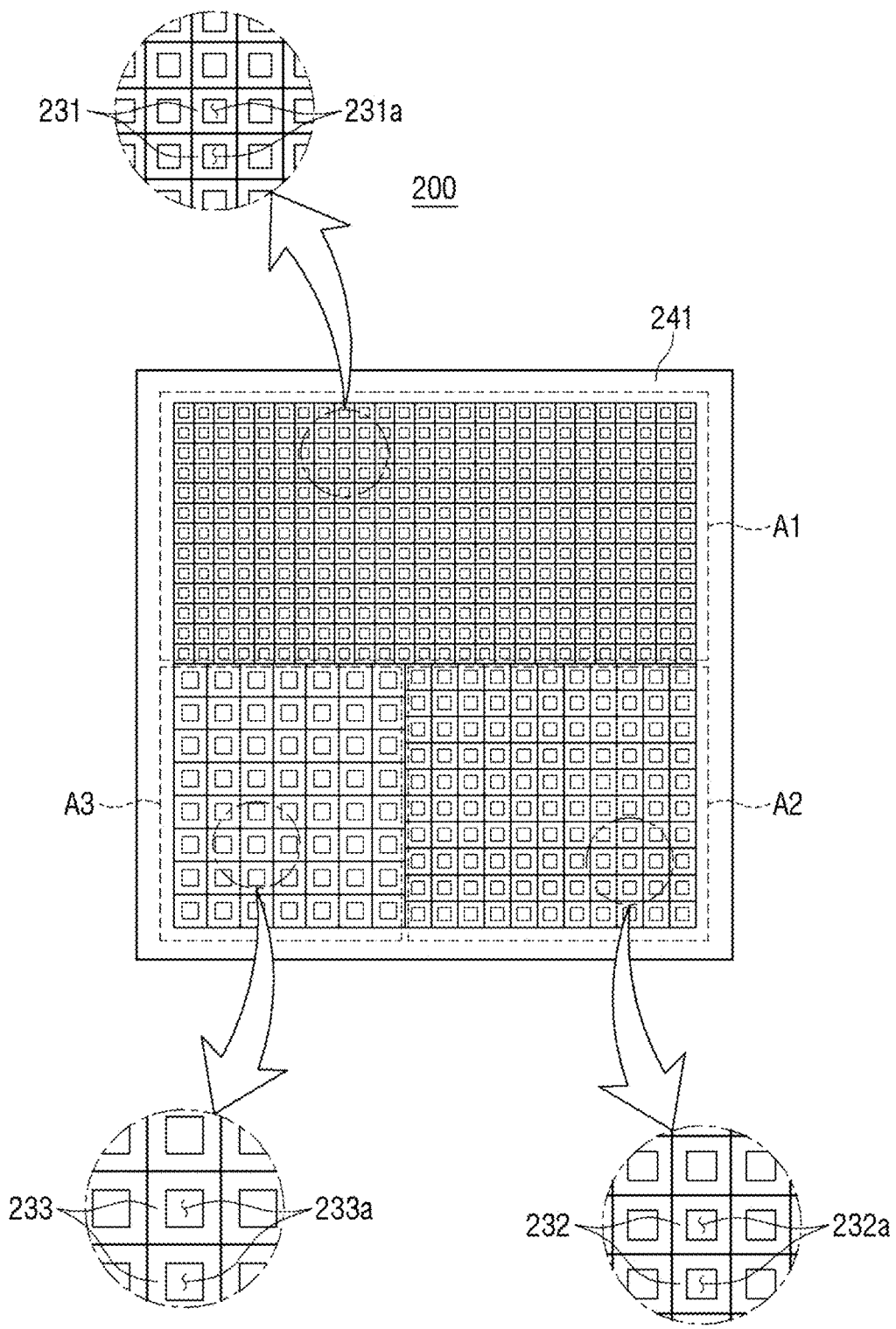
FIG. 10 is a schematic view showing shields having openings with different sizes depending on the sizes of the transmission regions according to the embodiment of the present disclosure.

FIG. 10 is a schematic view showing shields having openings with different sizes depending on the sizes of the transmission regions according to the embodiment of the present disclosure. Referring to FIG. 10, an opening 231a of the first shield 231 that belongs to the first transmission region A1 among the plurality of shields 230 may be formed to have the smallest size, and an opening 233a of the third shield 233 that belongs to the third transmission region A3 among the plurality of shields 230 may be formed to have the largest size, and accordingly, the first emission lens 221 may have the smallest diameter, and the third emission lens 223 may have the largest diameter.

Such a configuration may enable the pattern regions formed at different distances from the vehicle to have substantially equal size by forming the size of the opening of the shield to be smaller as the light is radiated to a farther distance from the vehicle because a relatively larger pattern region is formed due to the diffusion of the light as the light is radiated to a farther distance from the vehicle.

In FIGS. 9 and 10, a case in which the transmission region corresponding to the pattern region formed at the farther distance from the vehicle among the plurality of transmission regions A1, A2, and A3 has a larger size so that the first to third pattern regions may be formed with substantially equal sizes at different distances from the vehicle, and the emission lens and the opening of the shield have a smaller size is described as an example. However, the present disclosure is not limited thereto, and if the first to third pattern regions are desired to be formed to have different sizes at the same distances from the vehicle, the transmission region corresponding to the pattern region having a larger size among the plurality of transmission regions A1, A2, and A3 may have a larger size, and the emission lens and the opening of the shield may have larger sizes as well so that the first to third pattern regions may be formed in different sizes at the same distances from a vehicle.

Figure 11:
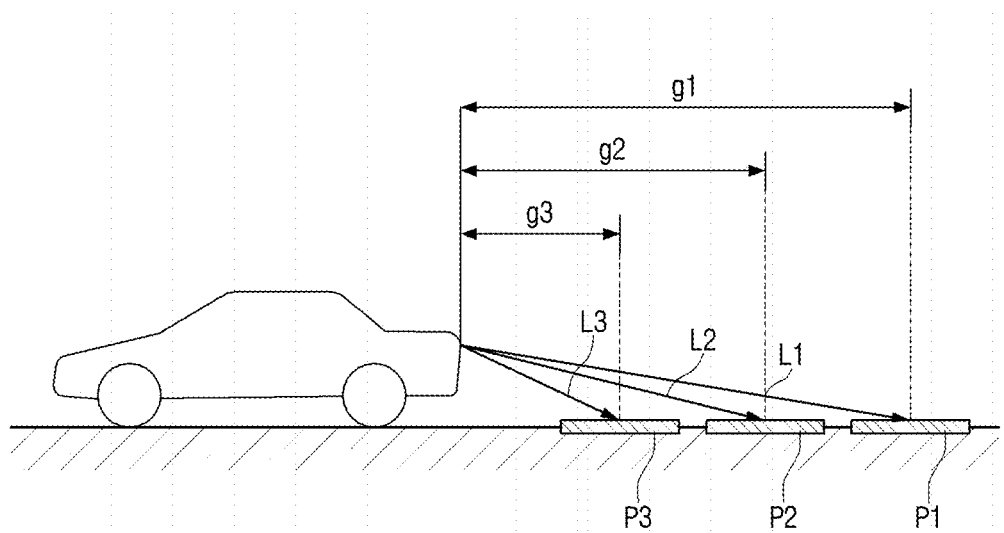
FIGS. 11 to 13 are schematic views showing light distribution patterns formed by the vehicle lamp according to the embodiment of the present disclosure.

As a result, when the first to third pattern regions have the same size, and the first to third pattern regions are formed at different distances from a vehicle, the sizes of the first to third transmission regions A1, A2, and A3 may be made different from one another, and at the same time, the diameters d1, d2, and d3 of the first to third emission lenses 221, 222, and 223 may be made different from one another, so that as shown in FIG. 11, when the lights L1, L2, and L3 respectively generated from the first to third light sources 110, 120, and 130 are radiated to the road surface around the vehicle, the first to third pattern regions P1, P2, and P3 may have substantially the same size and brightness even though the first to third pattern regions P1, P2, and P3 are formed at different distances g1, g2, and g3 from the vehicle.

As described above, FIG. 11 shows an example in which the first pattern region P1 is formed at the farthest distance from the vehicle, the third pattern region P3 is formed at the closest distance from the vehicle, and the first to third pattern regions P1, P2, and P3 have the same size.

Figure 12:
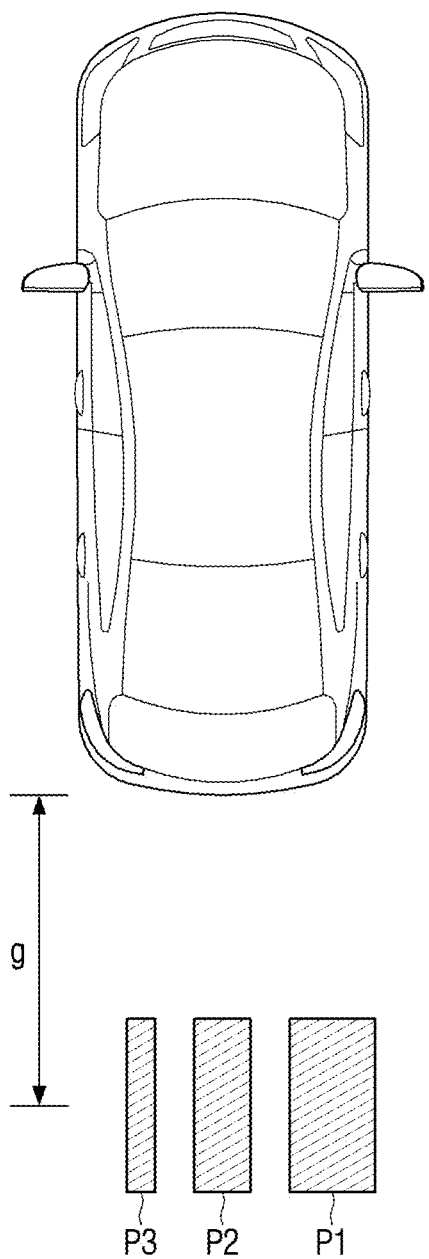

Meanwhile, as shown in FIG. 12, if the first to third pattern regions P1, P2, and P3 are desired to have different sizes and be formed at the same distance g from the vehicle, in order for the first to third pattern regions P1, P2, and P3 to have a substantially uniform brightness, the first transmission region A1 corresponding to the first pattern region P1 having the largest size among the plurality of transmission regions A1, A2, and A3 may have the largest size, and the first emission lens 221 and the opening 231a of the shield 231 may also have the largest sizes. In addition, the third transmission region A3 corresponding to the third pattern region P3 having the smallest size among the plurality of transmission regions A1, A2, and A3 may have the smallest size, and the third emission lens 223 and the opening 233a of the third shield 233 may also have the smallest sizes.

In the above-described embodiment, a case in which the first to third pattern regions formed at different distances from the vehicle have the same size and brightness and a case in which the first to third pattern regions formed at the same distances from the vehicle have different sizes are described as examples. However, these are merely examples for better understanding of the present disclosure, and the present disclosure is not limited thereto. The size of each of the first to third transmission regions A1, A2, and A3, the diameter of each of the plurality of emission lenses 220, and the size of the opening 230a of each of the plurality of shields 230 may be variously selected depending on the size of each of the first to third pattern regions P1, P2, and P3 and/or the distance at which each of the first to third pattern regions P1, P2, and P3 is formed.

Figure 13:
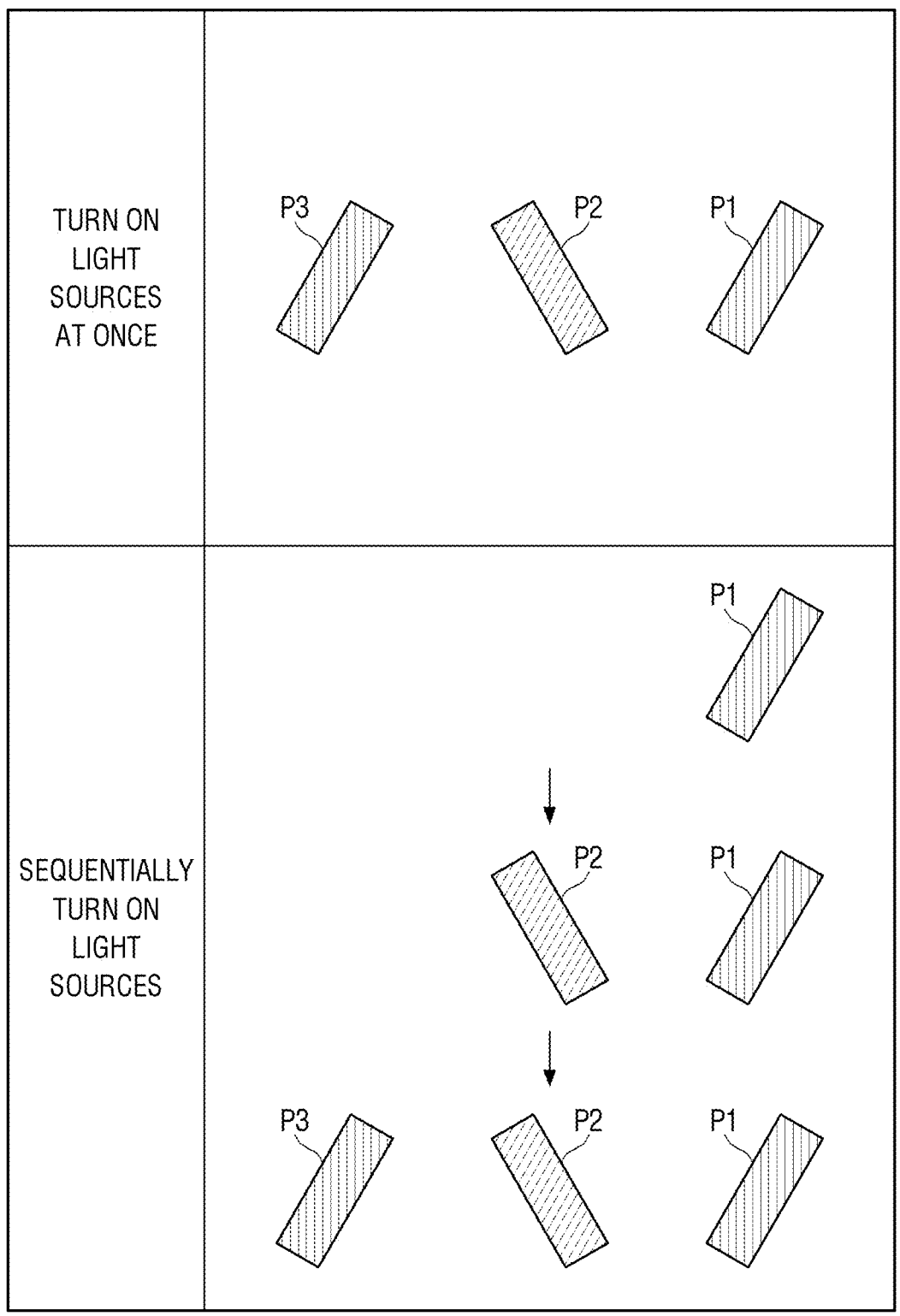

Meanwhile, FIGS. 11 and 12 show an example in which the first to third light sources 110, 120, and 130 are simultaneously turned on and the first to third pattern regions P1, P2, and P3 are simultaneously formed, but the present disclosure is not limited thereto. If the first to third light sources 110, 120, and 130 are desired to be sequentially turned on, as shown in FIG. 13, the first to third pattern regions P1, P2, and P3 may be sequentially formed, thereby implementing the animation effect. The animation effect may also be used for a design aspect to represent a vehicle's unique identity, and may also be used for more clearly notifying a proceeding direction of a vehicle such as in a turn signal lamp or a back-up lamp. The present disclosure is not limited thereto, however, and the animation effect may be used for various purposes such that the first to third light sources 110, 120, and 130 are sequentially turned to provide desired information.

Figure 14:
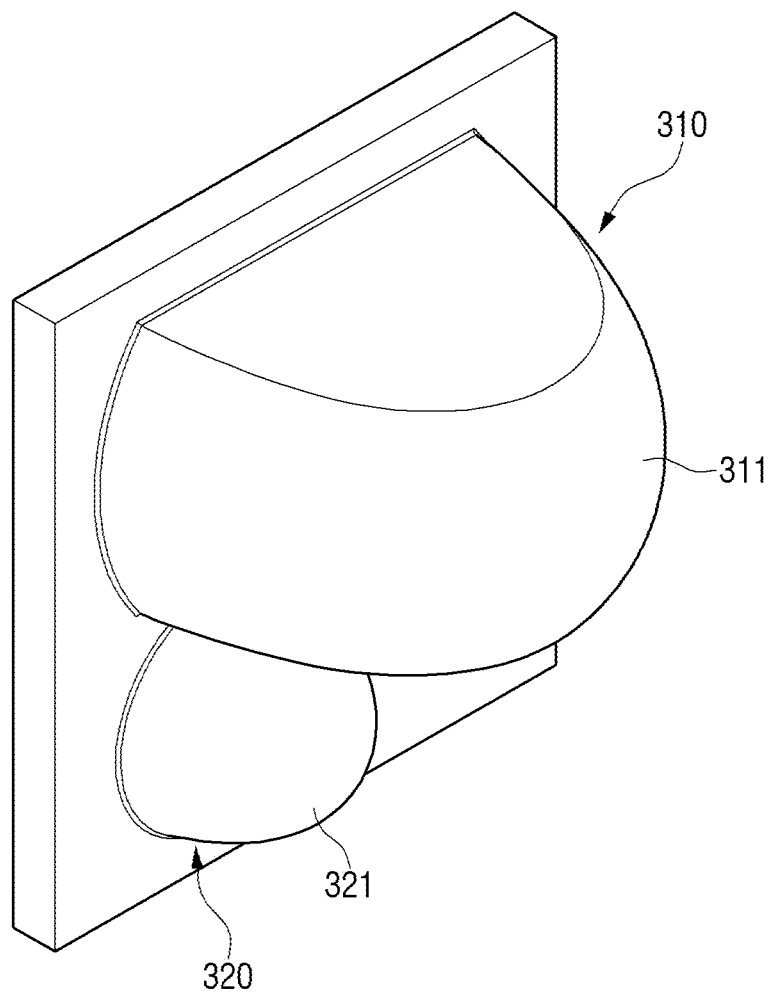
FIG. 14 is a perspective view showing a light transmission unit according to the embodiment of the present disclosure.
Figure 15:
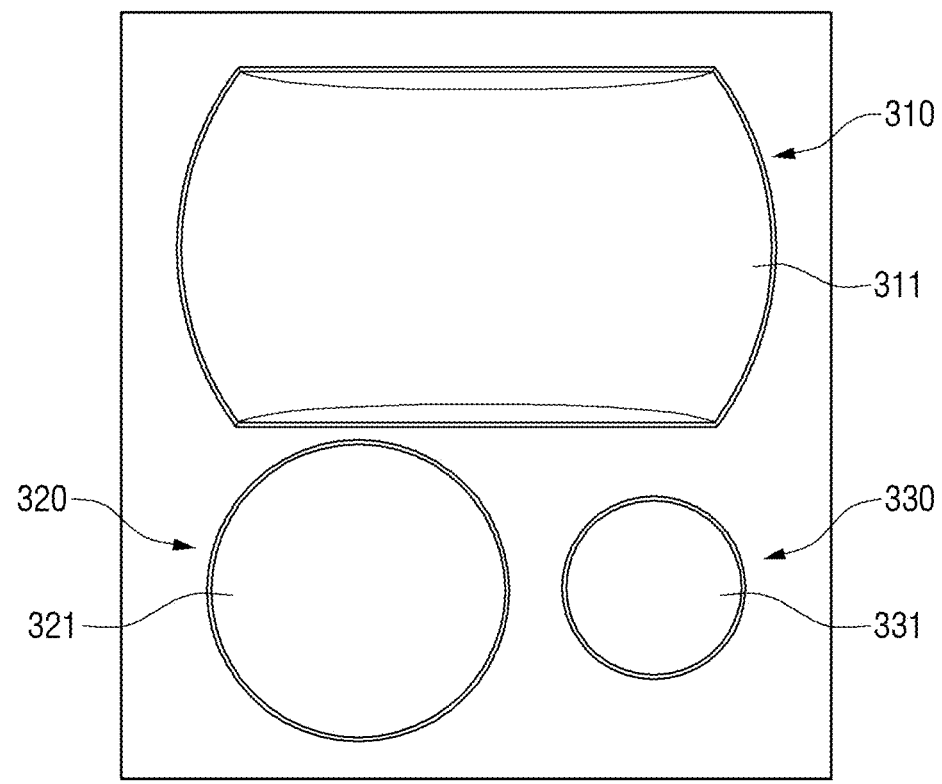
FIG. 15 is a front view showing the light transmission unit according to the embodiment of the present disclosure.

The light transmission unit 300 may condense the light generated from each of the plurality of light sources 110, 120, and 130 and may transmit the condensed light to the optical unit 200. FIG. 14 is a perspective view showing a light transmission unit according to the embodiment of the present disclosure, and FIG. 15 is a front view showing the light transmission unit according to the embodiment of the present disclosure. Referring to FIGS. 14 and 15, the light transmission unit 300 may include a plurality of light guide units 310, 320, and 330, each configured to guide the light generated from each of the plurality of light sources 110, 120, and 130, respectively, to be transmitted to the optical unit 200.

In the embodiment of the present disclosure, the plurality of light guide units 310, 320, and 330 may allow the light generated by each of the plurality of light sources 110, 120, and 130 to be converted into substantially parallel light and be transmitted to the optical unit 200, and thus may allow the light generated from each of the plurality of light sources 110, 120, and 130 to be substantially uniformly transmitted to each of the plurality of transmission regions A1, A2, and A3, which, in turn, may allow that the pattern region formed by the light transmitting each of the plurality of transmission regions A1, A2, and A3 has a substantially uniform brightness.

In the embodiment of the present disclosure, lenses with a convex shape in a forward direction to enable light collection (e.g., concentration or collimation) as the plurality of light guide units 310, 320, and 330 are described as an example, but this is only an example for better understanding of the present disclosure. The present disclosure is not limited thereto, and various optical elements capable of condensing light such as a reflector or a mirror instead of the lenses may be used as the plurality of light guide units 310, 320, and 330.

Incidence surfaces of each of the plurality of light guide units 310, 320, and 330 may be integrally formed, and emission surfaces 311, 321, and 331 may be separately formed, thereby allowing easier assembly of the light transmission unit 300. In some embodiments, however, the incident surfaces and the emission surfaces may be formed as a single component with a singling molding or the like.

The plurality of light guide units 310, 320, and 330 may have different sizes since the plurality of transmission regions A1, A2, and A3 have different sizes. For example, the first light guide unit 310 configured to guide the light incident on the first transmission region A1 among the plurality of light guide units 310, 320, and 330 may have the largest size, and the third light guide unit 330 configured to guide the light incident on the third transmission region A3 among the plurality of light guide units 310, 320, and 330 may have the smallest size.

The above-described vehicle lamp 1 according to the present disclosure may commonly utilize some components for forming the plurality of pattern regions when forming the light distribution pattern that includes the plurality of pattern regions on the road surface around a vehicle, thereby reducing the number of parts for forming the plurality of pattern regions and thus simplifying the configuration and reducing the cost.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A vehicle lamp comprising:
a light source unit including a plurality of light sources;
an optical unit including a plurality of incidence lenses, a plurality of emission lenses corresponding to the plurality of incidence lenses, and a plurality of shields each configured to block a part of light from being incident on each of the plurality of emission lenses; and
a light transmission unit that transmits light generated from the light source unit to the optical unit,
wherein the optical unit is divided into a plurality of transmission regions that transmit the light generated from the plurality of light sources to allow a plurality of pattern regions to be formed on a road surface around a vehicle,
wherein each of the plurality of pattern regions is formed by light that is generated by a corresponding light source among the plurality of light sources and transmitted through a corresponding transmission region among the plurality of transmission regions, and
wherein the plurality of emission lenses have different characteristic lengths depending on the transmission regions to which they belong.

2. The vehicle lamp of claim 1, wherein the plurality of light sources are simultaneously turned on or off.

3. The vehicle lamp of claim 1, wherein the plurality of light sources are sequentially turned on or off.

4. The vehicle lamp of claim 1, wherein the plurality of transmission regions include:
a first transmission region that transmits light of a first light source among the plurality of light sources to allow a first pattern region to be formed; and
a second transmission region that transmits light of a second light source among the plurality of light sources to allow a second pattern region to be formed.

5. The vehicle lamp of claim 4, wherein the first pattern region is formed at a farther distance from the vehicle than the second pattern region, and the first transmission region is larger than the second transmission region.

6. The vehicle lamp of claim 5, wherein a characteristic length of a first emission lens that belongs to the first transmission region among the plurality of emission lenses is smaller than a characteristic length of a second emission lens that belongs to the second transmission region among the plurality of emission lenses.

7. The vehicle lamp of claim 6, wherein each of the plurality of shields includes an opening through which light is transmitted, and
wherein an opening of a first shield corresponding to the first emission lens among the plurality of shields is smaller than an opening of a second shield corresponding to the second emission lens among the plurality of shields.

8. The vehicle lamp of claim 4, wherein a projected area of the first pattern region is larger than a projected area of the second pattern region, and the first transmission region is larger than the second transmission region.

9. The vehicle lamp of claim 8, wherein a characteristic length of a first emission lens that belongs to the first transmission region among the plurality of emission lenses is larger than a characteristic length of a second emission lens that belongs to the second transmission region among the plurality of emission lenses.

10. The vehicle lamp of claim 9, wherein each of the plurality of shields includes an opening through which light is transmitted, and
wherein an opening of a first shield corresponding to the first emission lens among the plurality of shields is larger than an opening of a second shield corresponding to the second emission lens among the plurality of shields.

11. The vehicle lamp of claim 1, wherein the optical unit includes an optical member having the plurality of incidence lenses disposed on an incidence surface, and the plurality of emission lenses disposed on an emission surface, and
wherein the plurality of shields are formed at one surface of the optical member or inside the optical member.

12. The vehicle lamp of claim 1, wherein the light transmission unit includes a plurality of light guide units that guide light generated from each of the plurality of light sources to the optical unit.

13. The vehicle lamp of claim 12, wherein the plurality of light guide units convert the light incident from each of the plurality of light sources into a parallel light beam.

14. The vehicle lamp of claim 12, wherein each of the plurality of light guide units includes an incidence surface and an emission surface, and the incidence surfaces of the plurality of light guide units are integrally formed.

15. The vehicle lamp of claim 12, wherein each of the plurality of light guide units has a size corresponding to each of the plurality of transmission regions.

* * * * *